Figure 1:
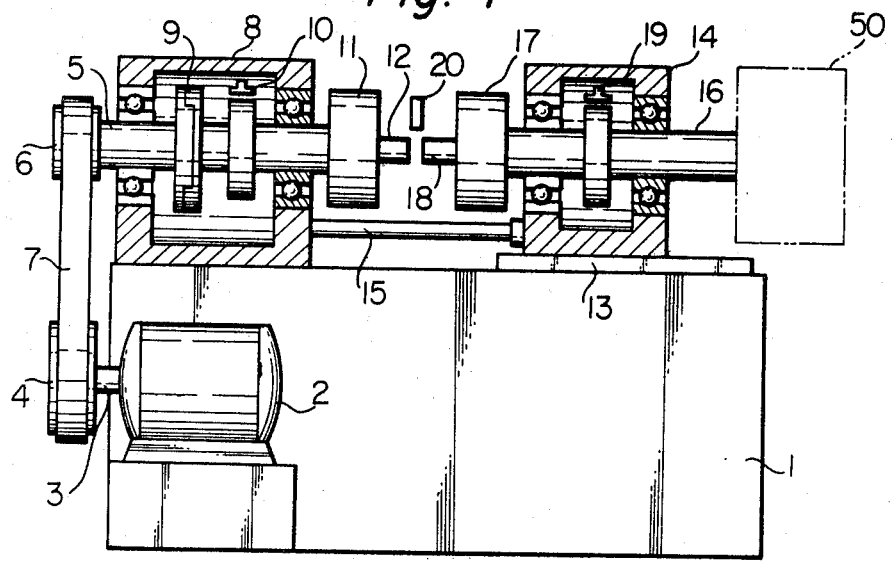

United States Patent
Takagi et al.

[11] 3,712,528
[45] Jan. 23, 1973

[54] FRICTION WELDING APPARATUS HAVING MEANS FOR CONTINUOUSLY REGULATING HEAT GENERATED DURING WELDING OPERATION

[75] Inventors: Nobuo Takagi; Rikuo Kuroyanagi, both of Kariya, Japan

[73] Assignee: Kabushiki Kaisha Toyoda Jidoshokki Seisakusho, Kariya-shi, Japan

[22] Filed: April 30, 1970

[21] Appl. No.: 33,292

[30] Foreign Application Priority Data

May 12, 1969   Japan.............................44/36378

[52] U.S. Cl. .................228/2, 29/470.3, 137/487, 156/73
[51] Int. Cl. ............................................B23k 27/00
[58] Field of Search ............228/2; 29/470.3; 156/73; 137/487

[56] References Cited

UNITED STATES PATENTS

| | | | |
|---|---|---|---|
| 3,538,592 | 11/1970 | Padilla | 228/2 |
| 3,563,444 | 2/1971 | Loyd | 228/2 |
| 3,609,854 | 10/1971 | Hasui | 228/2 X |
| 3,455,494 | 7/1969 | Stamm | 228/2 |
| 3,435,510 | 4/1969 | Oberle et al. | 29/470.3 |
| 3,337,108 | 8/1967 | Taylor | 228/2 |
| 3,235,158 | 2/1966 | Hollander | 228/2 |

*Primary Examiner*—J. Spencer Overholser
*Assistant Examiner*—R. J. Craig
*Attorney*—Robert E. Burns and Emmanuel J. Lobato

[57] ABSTRACT

Friction welding apparatus for frictionally welding together two workpieces comprises a driving spindle for rotationally driving one workpiece and a driven spindle slidable towards the driving spindle for moving the other workpiece into frictional engagement with the rotating workpiece which in turn rotationally drives both the other workpiece and the driven spindle. Means are provided for continuously regulating the amount of rotational resistance offered by the driven workpiece to accordingly control the quantity of heat generated during the frictional welding operation and such comprises a rotary pump rotationally driven by the driven spindle to pressurize hydraulic liquid in an hydraulic circuit and as the pump works against the hydraulic liquid to pressurize same, the pump exerts a countertorque on the driven spindle opposing rotation of the driven spindle. An adjustably settable relief valve is connected in the hydraulic circuit and the setting on the relief valve determines the magnitude of the countertorque and therefore the degree of resistance to rotation offered by the driven workpiece.

12 Claims, 2 Drawing Figures

PATENTED JAN 23 1973

3,712,528

INVENTOR

BY

ATTORNEY

FRICTION WELDING APPARATUS HAVING MEANS FOR CONTINUOUSLY REGULATING HEAT GENERATED DURING WELDING OPERATION

The present invention relates to a rotary bi-axle type friction welding apparatus, and more particularly relates to a rotary bi-axle type friction welding apparatus in which frictional heat energy generated at the contact surface of both work pieces to be welded is suitably regulated by controlling the discharging pressure of a pump connected to the driven spindle. Up to this time, in conventional friction welding techniques, the rotating mass disposed to the driven spindle was predetermined corresponding to the diameters and the qualities of the material of the work pieces to be friction welded so as to generate the required heat energy at the contact surface of both work pieces to be welded. However, in the above-described conventional friction welding technique, the following drawbacks were encountered;

1. attaching and detaching operations of the additional rotating mass were not always achieved readily and were rather troublesome,
2. the rotating mass was changed only by attaching and detaching the additional mass and if one wished to adjust the mass of the rotating mass so minutely one had to divide the mass into very small pieces, and
3. the rotating mass was incapable of being changed during the friction welding process of both work pieces under generating frictional heat energy.

In addition to the above-mentioned drawbacks, an application of the constant rotating mass as the rotating mass through the whole friction welding operation is not always the best way for certain kind of work pieces. For example, in case both work pieces are composed of copper, it is desirable to make the relative rotational speed of both work pieces zero as soon as possible as the temperature of the contact surface raises to a certain degree by decreasing the rotating mass. On the other hand, in case the surfaces of both work pieces to be contacted for welding are not vertical as to the rotating spindle, the rotating mass should be preferably adjusted in order to prevent the failure of the friction welding due to the insufficient upsetting of the work pieces at the welding portion.

Further, in case the moment of inertia of the driven system is very large, it is necessary to apply a braking device having a powerful capacity in order to stop the rotation of the driven system simultaneously when the friction welding process is completed under a condition of a synchronization of the rotational speed of the driving spindle with that of the driven spindle having a large moment of inertia. Therefore, the construction of the friction welding apparatus must be more durable and stronger than the same apparatus of normal use. As a result of the above requirement for the friction welding apparatus, the apparatus has become large-scaled and complicated in its construction.

It is therefore an object of the present invention to provide a friction welding apparatus wherein the frictional heat energy as suitable for the qualities, diameters and contact surface conditions of the materials to be welded is capable of being readily and continuously regulated.

Another object of the present invention is to provide a an apparatus for friction welding capable of readily adjusting the heat energy generating at the friction contact surface even in the friction welding process in accordance with the prescribed planning, by regulating the output of a suitable energy conversion means, for example, a pump which is connected to the driven spindle of the friction welding apparatus.

A further object of the present invention is to provide an apparatus for friction welding capable of regulating the friction thermal energy in accordance with the quality and diameter of the work pieces to be friction welded with a slight physical labor.

In general, the present invention is directed to an apparatus for friction welding wherein such an energy conversion means as for example a pump is connected to the driven system of the friction welding apparatus in order to acquire an optional and suitable heat energy required for effectively carrying out the friction welding by the regulation of the output pressure of the oil contained in the pump by a suitable valve means disposed to the passage ways of the oil discharging side of the pump.

Figure 2:
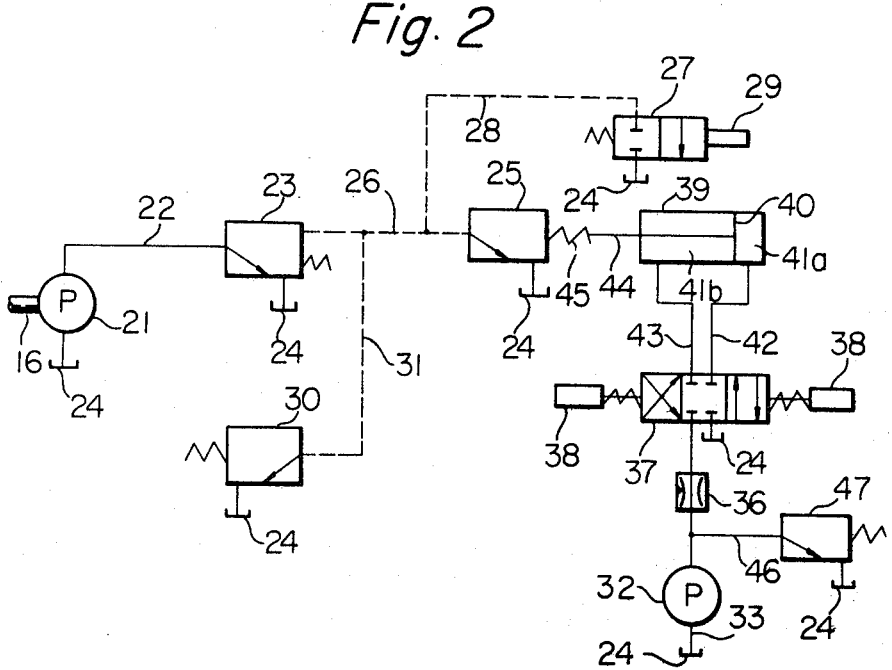

Further features and advantages of the present invention will be apparent from the ensuing description with reference to the accompanying drawings to which the scope of the invention is no way limited wherein, FIG. 1 is a schematic drawing illustrating the friction welding apparatus used in the present invention and FIG. 2 is a schematic drawing illustrating the connecting diagram of the pump and regulating valve devices in accordance with the present invention.

An example of the friction welding apparatus used for carrying out the present invention will be hereinafter explained referring to the accompanying drawings. Referring to FIG. 1, a driving motor 2 for driving the driving spindle is mounted on the left lower side of a bed 1 of the friction welding apparatus. A belt is hung between a pulley 4 mounted on the external end of a spindle disposed to the driving motor 2 and a pulley 6 mounted on the external end of a driving spindle 5 disposed to the friction pressure welding apparatus. A housing 8 of the driving spindles is disposed on the bed 1 of the friction welding apparatus. A braking member 10 and a clutching member 9 transmit or cut the rotation of the driving spindle. The above-mentioned braking member 10 and the clutching member 9 are respectively built in the housing 8, in which the driving spindle 5 is rotatably mounted.

A first rotatable means comprising a chuck 11 is mounted on the internal end of the driving spindle 5 and a first work piece 12 to be welded with a second work piece 18 is held in a detachable relationship. A guide base 13 is disposed on the bed 1 and a slidable housing 14 for driven spindle 16 is also disposed thereon so as to slide in forward and backward directions.

A piston rod 15 of a thrust cylinder (not shown in the drawing) is connected to the lower internal part of the slidable housing 14 for the driven spindle 16.

The driven spindle 16 is rotatably mounted on the slidable housing 14 coaxially and facing the above-mentioned driving spindle 5. A second rotatable means comprising a chuck 17 is mounted on the internal end of the driven spindle 16 and the second work piece 18 is held thereon in detachable relationship. A braking action is timely actuated on the driven spindle 16 by a braking member 19 built in the above-described slidable housing 14. In this connection, an energy conversion means 50, for example, a torque applying means such as a pump is attached to the driven spindle 16.

A cutting tool 20 is mounted on a suitable portion of the friction welding apparatus so as to cut down upsets generated at the contact portion of both first and second work pieces 12 and 18. Such upsets generating during the friction welding process under the frictional heating and contact pressure are cut simultaneously when generate at the contact portion of both work pieces.

Next, referring to FIG. 1 and FIG. 2, an oil pressure system will be particularly explained; an input spindle of the energy conversion means 50, that is, of the pump or torque applying means 21 is connected to the external end of the above-described driven spindle 16 (a right hand end in FIG. 1) by a suitable coupling means. The pump 21 is further connected to a pilot operated and vent-controlled first relief valve 23 by way of a main passage way 22 and then connected to a common oil tank 24. A second relief valve 25 is connected to the vent of the above-described first relief valve 23 by way of pilot passage way 26. An end of a pilot passage way 28 is connected to a portion of a change-over valve 27 for releasing an oil pressure of the pilot passage ways into zero and another end of the pilot passage way 28 is connected to the other pilot passage way 26 which connects the first and second relief valves 23 and 25. The above-mentioned change-over valve 27 is timely actuated by a change-over member 29 disposed thereon.

An end of a pilot passage way 31 is connected to a third relief valve 30 and another end of the pilot passage way 31 is connected to the above-described pilot passage way 26 which connects the first and second relief valves 23 and 25. The above-mentioned third relief valve 30 functions for prescribing the upper limit of the pilot oil pressure loaded in the above-mentioned pilot passage way 26. Further, all the oil passage ways of the above-described first, second and third relief valves and the change-over valves 23, 25, 30 and 27 are connected to the common oil tank 24.

A suction side of another pump 32 is connected to the above-mentioned common oil tank 24 by way of a passage way 33, while a discharging side of the pump 32 is connected to a four-way directional change-over valve 37 by way of a passage way 35 and a flow control valve 36. The above-mentioned four-way directional change-over valve 37 is timely actuated for changing over the flow direction of the oil by change-over members 38 and 38. A fourth relief valve 47 is disposed adjacent to the pump 32 or the flow control valve 36 by way of a passage way 46.

A fluid motor comprises a cylinder 39 divided into two rooms by a piston 40; that is, a cylinder room 41a located at the cylinder head side and another cylinder room 41b located at the piston rod side. The oil passage ways 42 and 43 elongated from the above-described four-way directional change-over valve 37 are connected, respectively, into the both rooms.

An adjusting or biasing spring 45 of the above-described second relief valve 25 is actuated by the stroke of the piston 40 so as to vary the biasing force exerted by the spring to thereby regulate the prescribed pressure of the second relief valve 25.

In this condition, the oil contained in the common oil tank 24 is supplied into the above-mentioned cylinder room 41a located at the cylinder head side of the oil pressure cylinder 39 by way of the passage way 35, the flow control valve 36, four-way directional change-over valve 37 and the passage way 42 so as to urge the advance motion of the piston rod 44 (in this condition, the piston 40 moves towards a left-hand direction in the drawing) and to push the adjusting spring 45. In the above-mentioned process, a prescribed oil pressure of the second relief valve 25 is previously adjusted in accordance with the condition of work pieces to be welded. The four-way directional change-over valve 37 is changed over again, simultaneously, as the adjustment of the second relief-valve is completed and restored again to its closed state.

In this case, the above-mentioned change-over valve 27 and the third relief valve 30 are in a closed condition as shown in FIG. 2.

Successively hereinafter, referring to FIG. 1 and FIG. 2, processes for friction welding in accordance with the present invention will be more concretely described.

In the first step, the clutching member 9 built into the housing 8 of the driving spindles is connected so as to transmit the rotation of the driving motor 2 into the first chuck 11 and the braking members 10 and 19 are released from the braking action of the driven spindle. In the above-described state, the driving motor 2 is actuated so as to rotate the first work piece 12 by way of the shaft 3 of the driving motor 2, pulley 4 mounted on the external end of the shaft 3, belt 7 hung between the pulley 4 and the pulley 6 mounted on the external end of the driving spindle 5, driving spindle 5, clutching member 9 and the first chuck 11 mounted on the internal end of the driving spindle 5. At the same time, the thrust cylinder (not shown in the drawing) is operated for advancing the slidable housing 14 by the thrusting action of the piston rod 15 (the slidable housing 14 with the second work piece moves towards a left-hand direction in the drawing). In the above-described manner, the second work piece 18 held by the second chuck 17 contacts the first work piece under the prescribed thrusting force.

Therefore, the driven spindle 16, having the second chuck 17 and second work piece 18, commences to rotate as both work pieces contact each other under the prescribed thrusting force following the rotation of the first work piece 11 due to the frictional action. In this condition, the pump 21 is actuated by the driven spindle 16 and supplies the oil from the common tank 24 into the pilot passage ways 26, 28 and 31, respectively, by way of the mail passage way 22 and the work done by the pump on the oil causes the pump to apply a counter torque to the spindle or, in other words, a torque opposing the rotational movement of the spindle 16. The pilot passage ways 26, 28 and 31 are, as previously stated, connected into the first relief valve 23 and the vents thereof. In the above-described relationship, a loading torque, which is proportional to the pressure of the oil discharged into the main passage way 22, is generated at the pump 21.

On the other hand, in order to increase the rotational speed of the driven system having a certain amount of moment of inertia from a stationary state into the equal rotational speed with that of the driving system, a substantial amount of the accelerating torque is required corresponding to the extent of the increase of the rotational speed of the driven spindle 16. In the above-mentioned relationship, heat energy generating at the contact portion of both work-pieces is equivalent to the value given in the form of a product of a relative slip angle between both work pieces and the sum of the above-described loading torque and of the accelerating torque, which accelerating torque is owed to the increase in the rotational speed of the driven spindle 16 from the stationary state to a running state at a rotational speed equal to that of the driving spindle. Thusly, the thermal energy generating at the welding portion is capable of being regulated freely and readily by controlling the discharging pressure of the pump 21, that is, by controlling the above-mentioned loading torque.

In the friction welding process, if a pilot oil pressure concerning the pilot passage way 26 which regulates the discharging pressure loaded to the main passage way 22 exceeds the prescribed pressure of the adjusting spring 45 which is actuated by the piston rod 44, the second relief valve 25 is operated automatically and simultaneously by the above-mentioned adjusting spring 45 and then the oil contained in the pilot passage way 26 is discharged into the common oil tank 24 so as to relieved the pilot oil pressure of the pilot passage way 26. In this state, successively, the first relief valve 23 which is regulated by the pilot oil pressure of the pilot passage way 26, is automatically operated so as to depress the discharging pressure of the pump 21, that is, to depress the loading torque of the driven spindle 16. By the above-mentioned operation, a generation of an excessive heat energy at the contact surface to be welded is effectively prevented. When the discharging pressure and the pilot oil pressure are depressed, respectively into the value less than the respective prescribed pressure the first and the second relief valves 23, 25 are restored to the original state. Thusly, in the previously described manner, if a prescribed loading torque of the pump corresponding to the diameters and the qualities of materials of which both work pieces are made is applied to the driven system 16, required frictional thermal energy reasonable for achieving a high quality friction welding is given at the welding portion of both work pieces in the welding process. The welding portion of both work pieces is heated to a sufficiently high temperature in the above-described manner and becomes a plastic deformable state. In this state, under the prescribed thrusting force the rotation of the both work pieces 12, 18 is completely synchronized, and the friction welding in accordance with the present invention is completed.

As above stated, in the friction welding operation carried out in accordance with the present invention, the loading torque of the pump is capable of being regulated continuously with the lapse of the welding process by introducing the oil into the cylinder room 41a located at the cylinder head side or into the cylinder room 41b located at the piston rod side of the oil pressure cylinder 39 from the common oil tank 24 so as to actuate the piston rod 40 and to adjust the spring 45 of the third relief valve 25. In other words, the friction thermal energy generated at the contact surface to be welded is regulated continuously.

Further, if at the final stage of the heat generation process at the welding surface, a rapid increase in the rotational speed of the driven spindle 16 is required in order to either make the length of all the welded work pieces uniform or to improve the strength of the welded part, the change-over valve 27 may be timely actuated by the operation of the change-over member 29. In the above-described condition, the oil contained in the pilot passage way 28 is discharged into the common oil tank 24 so that the pilot oil pressure loaded to the pilot passage way 26 can be nullified. Then the first relief valve 23 is automatically changed over so as to simultaneously release the loading torque of the driven spindle. On the other hand, the third relief valve 30 is provided so as to prescribe the upper limit of the pilot oil pressure loaded to the pilot passage way 26, and if the pressure prescribed by the adjusting spring 45 exceeds the above-described upper limit of the pilot oil pressure, the third relief valve 30 is actuated automatically so as to control the pilot pressure of the pilot passage way 26 below the predetermined pressure.

Thusly, in the rotary bi-axle type friction welding apparatus constructed in accordance with the present invention, the regulation of the frictional heat energy required for the friction welding of the both work pieces 12 and 18 is suitably achieved by connecting the suitable pump 21 to the driven system of the friction welding apparatus. In other words, the adjustment of the frictional heat energy is achieved by controlling the discharging pressure of the pump by regulating the pilot oil pressure and further controlling the above-mentioned pilot oil pressure by the controlled operation of the oil pressure cylinder 39. Therefore, in accordance with the present invention, the construction of the apparatus is capable of being simplified and miniaturized contrary to the conventional welding apparatus in which the thermal energy is regulated by selection of the additional rotating mass.

It is to be understood that various modifications can be made without departing from the spirit and scope of the present invention. For example, if an external energy is positively applied to the above-mentioned pump 21 explained in the embodiment of the present invention, such a work piece as having extremely small diameter can also be capable of being friction welded satisfactorily. And further, an electric generator, air fan etc. may be applied as an energy conversion means instead of the pump.

What we claim is:

1. In a rotary bi-axle type friction welding apparatus: a first chuck, a driving spindle coaxially holding said first chuck, a driven spindle disposed on a slidable housing in a rotatable relationship, a second chuck mounted on said driven spindle facing said first chuck, means for urging said first chuck and said second chuck toward and away from each other, controlling means comprising a rotary pump connected to said driven spindle for controlling the rotational energy of said driven spindle, and regulating means for regulating the output of said controlling means.

2. An improvement according to claim 1, wherein said regulating means comprises valve devices operable to continuously regulate discharging pressure of said pump and another valve device which when required instantaneously releases said discharging pressure of said pump.

3. An improvement according to claim 2, wherein said valve devices comprise at least one pressure relief valve disposed in the discharging pipe of said oil pressure pump and means for continuously controlling the opening pressure of said pressure relief valves.

4. An improvement according to claim 3, wherein said controlling means for said opening pressure of said relief valves comprises a cylinder device having a piston-rod connected to a spring disposed to said relief valves and a flow control valve for actuating said piston-rod of said cylinder device with a regulated velocity.

5. In a friction welding apparatus for frictionally welding together two workpieces: first rotatable means for releasably and rotatably holding a first workpiece; a movably mounted slide member having second rotatable means thereon for releasably and rotatably holding a second workpiece; means mounting said slide member for movement towards and away from said first rotatable means to effect pressure contact between the workpieces; means for moving said slide member towards and away from said first rotatable means; drive means for rotationally driving said first rotatable means to effect rotation of the first workpiece whereby the first workpiece frictionally and rotationally drives the second workpiece when the workpieces are in pressure contact; torque applying means for applying a variably settable torque to said second rotatable means opposing rotational movement of the second workpiece by the first workpiece to effectively control the frictional heat energy generated by the workpieces; and control means for continuously controlling the magnitude of the applied torque throughout the frictional welding of the workpieces.

6. An apparatus according to claim 5; wherein said torque applying means comprises a rotary pump connected to undergo rotation with said second rotatable means, and a fluid circuit connected to said rotary pump receptive of a liquid during use of the apparatus to supply the liquid to said rotary pump and having means for providing a variably settable resistance to the flow of liquid discharged by said rotary pump whereby said rotary pump works against the resistance to develop said torque and apply same to said second rotatable means.

7. An apparatus according to claim 6; wherein said means for providing a variably settable resistance to the flow of liquid comprises a relief valve disposed on the output side of said rotary pump for relieving the pressure of the liquid discharged by said rotary pump whenever said pressure is above a variably settable value.

8. An apparatus according to claim 7; wherein said control means includes means for applying a variably settable control force to said relief valve to accordingly vary the pressure value at which said relief valve opens to relieve the liquid pressure.

9. An apparatus according to claim 8; wherein said last-mentioned means includes a fluid pilot circuit connected to said relief valve receptive of a liquid during use of the apparatus and operable to apply a liquid biasing force to said relief valve to thereby set the pressure value at which said relieft valve opens, and means for selectively varying the liquid biasing force to accordingly vary the setting at which said relief valve opens.

10. An apparatus according to claim 9; wherein said means for selectively varying the liquid biasing force includes another relief valve connected in said fluid pilot circuit operable to relieve the pressure of the liquid in said fluid pilot circuit when same is above a variably settable level, and means for varying the pressure level at which said another relief valve opens.

11. An apparatus according to claim 10; wherein said means for varying the pressure level at which said another relief valve opens comprises a biasing spring biasing said another relief valve into a closed position, a fluid motor connected to said biasing spring operable in response to pressurized fluid supplied thereto and exhausted therefrom to vary the biasing force exerted by said biasing spring on said another relief valve.

12. An apparatus according to claim 10; wherein said relief valve has means therein defining a vent opening providing communication between said fluid circuit and said fluid pilot circuit whereby some of the pressurized liquid in said fluid circuit passes through said vent opening and comprises the pressurized fluid in said fluid pilot circuit.

* * * * *